(12) United States Patent
Nakamoto et al.

(10) Patent No.: US 10,549,460 B2
(45) Date of Patent: Feb. 4, 2020

(54) METHOD OF MANUFACTURING HEAT-RESISTANT CONTAINER

(71) Applicant: NAKAMOTO PACKS CO., LTD., Osaka-shi, Osaka (JP)

(72) Inventors: Takashi Nakamoto, Osaka (JP); Hitoshi Sasaki, Kawasaki (JP); Kaori Shimizu, Osaka (JP)

(73) Assignee: NAKAMOTO PACKS CO., LTD., Osaka-Shi (JP)

( * ) Notice: Subject to any disclaimer, the term of this patent is extended or adjusted under 35 U.S.C. 154(b) by 248 days.

(21) Appl. No.: 15/466,427

(22) Filed: Mar. 22, 2017

(65) Prior Publication Data

US 2017/0274567 A1 Sep. 28, 2017

(30) Foreign Application Priority Data

Mar. 24, 2016 (JP) .................. 2016-060016

(51) Int. Cl.
| | | |
|---|---|---|
| *B29C 43/56* | (2006.01) | |
| *B29C 51/10* | (2006.01) | |
| *B29C 51/00* | (2006.01) | |
| *B29B 7/84* | (2006.01) | |
| *B29C 43/00* | (2006.01) | |
| *B29C 43/02* | (2006.01) | |
| *B29D 22/00* | (2006.01) | |
| *B29B 11/10* | (2006.01) | |

(Continued)

(52) U.S. Cl.
CPC .............. *B29C 43/56* (2013.01); *B29B 7/847* (2013.01); *B29C 43/003* (2013.01); *B29C 43/02* (2013.01); *B29C 51/002* (2013.01); *B29C 51/10* (2013.01); *B29D 22/003* (2013.01); *B29B 11/10* (2013.01); *B29B 11/14* (2013.01); *B29C 2043/561* (2013.01); *B29K 2067/003* (2013.01); *B29K 2105/256* (2013.01); *B29K 2995/004* (2013.01); *B29K 2995/0016* (2013.01); *B29K 2995/0025* (2013.01); *B29K 2995/0026* (2013.01); *B29L 2031/712* (2013.01)

(58) Field of Classification Search
CPC ....... B29C 43/56; B29C 43/003; B29C 43/02; B29B 7/847

See application file for complete search history.

(56) References Cited

U.S. PATENT DOCUMENTS 3,962,154 A * 6/1976 Egli ................. B29C 44/42
521/143
2014/0339124 A1* 11/2014 Sasauchi ............. B29C 51/10
206/524.3

* cited by examiner

*Primary Examiner* — Jacob T Minskey
*Assistant Examiner* — Melody Tsui
(74) *Attorney, Agent, or Firm* — Birch, Stewart, Kolasch & Birch, LLP (57) ABSTRACT

Upon manufacturing a heat-resistant container using PET sheet, high heat-resistance is achieved without a stretching operation. The method comprises a molding sheet-making process, wherein a sheet is made including organic acid metal salt particulates produced by allowing an inorganic basic material or carbonate that is solid at ordinary temperature to react with an organic acid that is solid at ordinary temperature in the equivalent relationship, and a container-molding process, wherein, the molding sheet made in the molding sheet-making process is heated to 80-130° C., formed into a container shape by a vacuum or vacuum-pressure forming machine using a mold, and heat-set by keeping at 130-220° C. in the same mold, and the container formed in the container-molding process has a crystallinity of 18% or more.

6 Claims, 2 Drawing Sheets

(51) Int. Cl.
*B29B 11/14* (2006.01)
*B29K 67/00* (2006.01)
*B29K 105/00* (2006.01)
*B29L 31/00* (2006.01)

Crystallization Speed of PET (Insoluble Catalyst)

Fig. 3

METHOD OF MANUFACTURING HEAT-RESISTANT CONTAINER

TECHNICAL FIELD

This invention relates to a method of manufacturing a transparent heat-resistant PET (polyethylene terephthalate) container or a highly heat-resistant PET container that is opaque. More particularly, it relates to a method of manufacturing a heat-resistant container characterized by utilizing an organic acid metal salt produced by allowing an inorganic basic material or carbonate to react with an organic acid, as a crystal nucleator of PET resin.

BACKGROUND ART

In food shops in convenience stores, department stores, super markets, etc., foods, such as daily dishes, noodles, and salads are packaged in a food container, such as a tray, cup or bowl, and sold. The container is composed of a container body wherein a food is placed and a cover which seals the container body. The container body is, in general, manufactured by heat-forming a sheet of polypropylene, foamed polypropylene, polypropylene containing filler, polyethylene, foamed polyethylene, foamed polystyrene, heat-resistant foamed polystyrene, A-PET (amorphous PET) or the like, using a vacuum forming, pressure forming, or vacuum-pressure forming machine. The cover is formed of a sheet of A-PET, biaxially stretched polystyrene (OPS), polypropylene (PP) or the like (see Patent Document 1).

Recently, since uniaxially stretched PET film is highly transparent and heat-resistant, it is used for a touch panel and a liquid crystal display element relating to IT (see Patent Document 2, 3, 4).

Food purchased from a convenience store or the like is heated in the food container by a microwave oven. When a food containing oil is heated together with the food container by a microwave oven, the temperature of the food is elevated to about 150° C. Therefore, the food container is required to have a high heat resistance capable of resisting up to 150° C. Even, in the case of a food not containing oil, since the temperature is raised to around 90° C., the heat resistance resisting up to 100° C. is required.

Furthermore, high transparency is required for food containers, in order to recognize the contained food clearly at a glance and to improve commodity value.

However, in the aforementioned various sheets used heretofore, there is no sheet satisfying both high heat resistance and high transparency simultaneously. Namely, among these various sheets, although A-PET sheet and OPS (biaxially stretched polystyrene) have high transparency, these sheets are softened at about 80° C. and do not have high heat resistance. Although a PP sheet has high heat resistance, it is inferior in transparency.

Uniaxially stretched PET film used for a touch panel or the like has high transparency and heat resistance, but, as described in Patent Document 2, after being uniaxially stretched in TD (lateral), it is heat-set at 220° C. As a result, it is not elongated even by heating, and it is impossible to form into a container shape by a heat forming machine.

Thereupon, the applicant proposed a heat-resistant transparent container produced by primarily uniaxial stretching of an A-PET sheet at a stretching temperature of 90-120° C. at a draw ratio of 2.6-3.7 times in the MD (longitudinal direction), followed by heat-setting at a temperature higher than the stretching temperature by 5-20° C. in the primary stretching and heat-setting process, and subsequently, thermoforming the primarily stretched A-PET sheet at 80-130° C. while stretching secondarily, followed by secondary heat-setting in the same mold at 160° C. or more in the secondary stretching and heat-setting process, wherein the crystallinity of the primarily stretched A-PET through the primary stretching and heat-setting process is 22% or more and less than 30% represented by the following formula, and the crystallinity of the container cooled through the aforementioned secondary stretching and heat-setting process is 30% or more represented by the following formula (see Patent Document 5).

$$\text{crystallinity}(\%) = \frac{\text{heat quantity of fusion per mole} - \text{heat quantity of cold crystallization per mole}}{\text{heat quantity of fusion per mole of perfect crystal of } PET\ (26.9\ KJ)} \times 100 \quad [\text{Mathematical 1}]$$

PRIOR ART DOCUMENT

Patent Documents

[Patent Document 1] JP 2005-329972 A
[Patent Document 2] JP 2000-82335 A
[Patent Document 3] JP 2000-82336 A
[Patent Document 4] JP 5-165035 A
[Patent Document 5] JP 4223520

SUMMARY OF THE INVENTION

Problems to be Solved by the Invention

In the aforementioned heat-resistant transparent container proposed by the applicant, A-PET sheet is uniaxially stretched in the MD direction to generate fine crystals by the orientation of PET, and the crystals are allowed to grow by the heat in the mold of the molding machine to raise crystallinity. Thus, if the size of the crystal is 400 nm or less, the container is very excellent having high transparency and high heat resistance.

However, the higher the uniaxial draw ratio in the MD is, the weaker the strength in the TD direction is. As a result, when the uniaxial draw ratio exceeds 3.2 times, dropping strength of the molded container tends to weaken. Moreover, since uniaxial stretching operation is essential, the number of working processes is many.

Accordingly, it has been desired to raise crystallinity without stretching the A-PET sheet.

Means for Solving the Problems

Incidentally, as stated above, in order to impart heat-resistance with transparency by crystallization of a PET resin, it is necessary to render the size of crystals at the lower end of visible rays of 400 nm or less. Nevertheless, when conventional solid nucleator is pulverized for the purpose of rendering a small size, the possible minimum average size is, even in the case of talc which is frequently used, about 10 μm. Therefore, it is impossible to render the size to 400 nm or less.

Then, as a means of producing such a minimum size nucleator, the inventors noted a chemical reaction where the reaction proceeds in molecular size and produces products in molecular size. The size of one molecule of the product is about $10^{-22}$ g, and it is estimated that when approximately $10^{10}$ molecules gather to form an aggregate, it may act as a crystal nucleator. The size of the aggregate is estimated to be $10^{-22} \times 10^{10} = 10^{-12}$ g. Provided that the aggregate is spherical having a specific gravity of 2-3, its diameter is estimated to be around 1 nm.

Therefore, they considered that, by using the aggregates as a crystal nucleator, fine crystals can be generated corresponding to the crystals generated by orientation, and the object may be achieved. They noted acid-base reaction as the chemical reaction meeting the object. In order for the reaction to proceed smoothly, at least either the acid or the base is in a liquid state upon the reaction. Then, they considered employing an organic acid that is solid at ordinary temperature as the acid. Thus, they found that, when the melting point of an organic acid metal salt produced by allowing an inorganic basic material or carbonate to react with an organic acid in the equivalent relationship is higher than the melting point of PET resin, it is present in a solid state in the melted PET resin and acts as crystal nucleator to grow fine crystals of the PET.

The present invention was made based on the above findings, and utilizes organic acid metal salt particulates as the crystal nuclei in the molding process of a heat-resistant container by including the fine organic acid metal salts in the molding sheet for forming the heat-resistant container.

Thus, the present invention provides a method of manufacturing a heat-resistant container which comprises:

a molding sheet-making process, wherein a sheet is made including organic acid metal salt particulates produced by allowing an inorganic basic material or carbonate that is solid at ordinary temperature to react with an organic acid that is solid at ordinary temperature in the equivalent relationship, and a container-molding process, wherein, the molding sheet made in the molding sheet-making process is heated to 80-130° C., formed into a container shape by a vacuum or vacuum-pressure forming machine using a mold, and heat-set by keeping at 130-220° C. in the same mold, and the container formed in the container-molding process has a crystallinity of 18% or more represented by the following formula.

$$\text{crystallinity}(\%) = \frac{\text{heat quantity of fusion per mole} - \text{heat quantity of cold crystallization per mole}}{\text{heat quantity of fusion per mole of perfect crystal of PET (26.9 KJ)}} \times 100 \quad [\text{Mathematical 1}]$$

In an aspect of the invention, said molding sheet-making process comprises, making a reacted masterbatch by mixing an inorganic basic material or carbonate that is solid at ordinary temperature with an organic acid that is solid at ordinary temperature in the equivalent relationship and adding the mixture to a PETG resin, allowing the masterbatch to react by heating and kneading to produce the organic acid metal salt particulates, adding the reacted masterbatch in an amount corresponding to 0.01-1.0% by weight as the mixture of the inorganic basic material or carbonate that is solid at ordinary temperature and the organic acid that is solid at ordinary temperature, and 0.2-1.0% by weight of a chain extender for PET resin to the PET resin, charging the mixture of the reacted masterbatch and the PET resin into an extruder having two or more vent holes, degassing under a condition where the PET resin is melted with heating by sucking at a high vacuum of −99.99 kPa or more from the vent holes, and extruding into the molding sheet.

In another aspect of the invention, said inorganic basic material or carbonate that is solid at ordinary temperature is a member selected from CaO, Ca(OH)$_2$, NaHCO$_3$ and Na$_2$CO$_3$, and said organic acid that is solid at ordinary temperature is a member selected from benzoic acid and phthalic acid.

In still another aspect of the invention, said chain extender for PET resin is styrene-methyl(metha)acrylate-glycidyl methacrylate.

In a further aspect of the invention, a method of manufacturing a heat-resistant container which comprises making a reacted masterbatch by mixing an inorganic basic material or carbonate that is solid at ordinary temperature with an organic acid that is solid at ordinary temperature in the equivalent relationship and adding the mixture to a PETG resin, allowing the masterbatch to react by heating and kneading to produce the organic acid metal salt particulates, adding the reacted masterbatch in an amount corresponding to 0.01-1.0% by weight as the mixture of the inorganic basic material or carbonate that is solid at ordinary temperature and the organic acid that is solid at ordinary temperature, and 0.2-1.0% by weight of a chain extender for PET resin to the PET resin, charging the mixture of the reacted masterbatch and the PET resin into an extruder having two or more vent holes, degassing under a condition where the PET resin is melted with heating by sucking at a high vacuum of −99.99 kPa or more from the vent holes, and introducing into a T die for coextrusion, while, charging a PET resin into a subsidiary extruder, melting it with heating, and introducing the T die for coextrusion, molding a coextruded molding sheet comprising a main layer made of the PET resin including the organic acid metal salt particulates produced from the inorganic basic metal compound and the organic acid, and at least an inner layer made of the PET resin, heating the coextruded molding sheet to 80-130° C., forming the coextruded molding sheet into a container shape by a vacuum or vacuum-pressure forming machine using a mold, and heat-setting by keeping at 130-220° C. in the same mold, wherein the container thus formed has a crystallinity of 18% or more represented by the following formula.

$$\text{crystallinity}(\%) = \frac{\text{heat quantity of fusion per mole} - \text{heat quantity of cold crystallization per mole}}{\text{heat quantity of fusion per mole of perfect crystal of PET (26.9 KJ)}} \times 100 \quad [\text{Mathematical 1}]$$

Effects of the Invention

In the method of manufacturing a heat-resistant container of the invention, the molding sheet includes organic acid metal salt particulates produced by allowing an inorganic basic material or carbonate that is solid at ordinary temperature to react with an organic acid that is solid at ordinary temperature in the equivalent relationship to a PET resin.

Therefore, when the heat-resistant container is molded using the molding sheet, since the molding sheet heated to 80-130° C. is formed into a container shape by a vacuum or vacuum-pressure forming machine using a mold, and heat-set by keeping at 130-220° C. in the same mold, crystals of PET grow on the organic acid salt particulates, which are dispersed in the molding sheet as a crystal nucleator. As a result, the crystallinity can be made 18% or more represented by the following formula.

$$\text{crystallinity}(\%) = \frac{\text{heat quantity of fusion per mole} - \text{heat quantity of cold crystallization per mole}}{\text{heat quantity of fusion per mole of perfect crystal of PET (26.9 KJ)}} \times 100 \quad [\text{Mathematical 1}]$$

In the first aspect of the invention, first, a reacted masterbatch according to PETG is made by mixing the inorganic basic material or carbonate that is solid at ordinary temperature and the organic acid that is solid at ordinary temperature in the equivalent relationship to produce the organic acid metal salt particulates. Namely, upon making the masterbatch by mixing the inorganic basic material or carbonate that is solid at ordinary temperature and the organic acid that is solid at ordinary temperature in the equivalent relationship, the basic material or carbonate reacts with the organic acid by heating while making the masterbatch to produce fine organic acid metal salt. Meanwhile, the organic acid is melted and infiltrated into the inorganic basic material or carbonate that is still solid to react with it to generate the organic acid metal salt and water. The reaction proceeds in molecular size, and the product of the organic metal salt is generated also in molecular size. Some of the molecules gather to form aggregates or crystals of the organic acid metal salt. Besides, since they are added as the masterbatch upon making the molding sheet, they can be blended uniformly even being a small amount.

In the second aspect of the invention, the inorganic basic material that is solid at ordinary temperature is e.g. CaO or Ca (OH)$_2$, and it reacts with the organic acid through a neutralization reaction to produce the organic acid metal salt and water. The carbonate that is solid at ordinary temperature is, e.g. Na HCO$_3$ or Na$_2$Co$_3$, and there is a relationship of weaker acid salt+stronger acid→stronger acid salt+weaker acid between the carbonate and the organic acid. Since the carbonic acid is a weakest acid, the carbonate reacts with the organic acid with the assistance of heat in the extruder to produce the organic acid metal salt, carbon dioxide gas and water. The organic acid that is solid at ordinary temperature, e.g. benzoic acid (mp: 122° C.) and phthalic acid (mp: 191° C.), is melted to form a liquid by heating while making a masterbatch or heating in the extruder, and infiltrated into the carbonate. Then, the organic acid reacts with the carbonate to produce the organic acid metal salt, which acts as the crystal nucleator.

In the third aspect of the invention, the chain extender for PET resin is styrene-methyl(metha)acrylate-glycidyl methacrylate, which has 9-10 epoxy groups and is highly reactive, and it can modify lower molecular weight PET molecular chains, which are produced by depolymerization by heat and water, into high molecular weight PET resin by binding them.

In the fourth aspect of the invention, an inorganic basic material or carbonate that is solid at ordinary temperature and an organic acid that is solid at ordinary temperature are mixed in the equivalent relationship and added to the PET resin for masterbatch. Then, they are allowed to react previously by heating and kneading while making the masterbatch to produce fine organic acid metal salt. The reacted masterbatch is added to the PET resin composing the main layer. Therefore, the organic acid metal salt particulates acting as the crystal nucleator can be dispersed into the main layer. Moreover, a chain extender is added to a PET resin, and the PET resin is degassed by sucking at a high vacuum of −99.99 kPa or more from the vent holes. Therefore, water produced through the reaction can be removed, and lower molecular weight PET molecular chains produced by the depolymerization of a part of PET resin can be bound to be modified into higher molecular weight PET resin. Furthermore, a virgin PET resin is charged into a subsidiary extruder, and a molding sheet composed of a main layer and at least an inner layer is formed by coextrusion. Thus, a container is molded using the molding sheet composed of at least two layers. Therefore, since the inner layer being in contact with food is rendered the virgin PET resin layer, the container is favorable from the viewpoint of safety and sanitation. By keeping the molding sheet at 130-220° C. in the same mold of the forming machine, the crystallinity can be made 18% or more, and thereby, heat resistance can be imparted.

MODE FOR CARRYING OUT THE INVENTION

In the method of manufacturing a heat-resistant container of the invention, first, a molding sheet is made including organic acid metal salt particulates produced by allowing an inorganic basic material or carbonate, both of which are metal compounds, that is solid at ordinary temperature to react with an organic acid that is solid at ordinary temperature. As a means of including the organic acid metal salt particulates into the molding sheet, a reacted masterbatch (hereinafter referred to as "MB") including the organic acid metal salt particulates is made, and the reacted MB is added to PET resin upon making the molding sheet. Namely, upon making the reacted MB, an inorganic basic material or carbonate that is solid at ordinary temperature is allowed to react with an organic acid that is solid at ordinary temperature to produce organic acid metal salt in the reacted MB.

The PET resin includes but is not limited to virgin PET resin, PET resin for fiber, recovered PET flakes and the like. PET resin for fiber, recovered PET flakes and the like are preferred because of manufacturing the molding sheet cheaper.

The basic material that is solid at ordinary temperature includes but is not limited to oxides and hydroxides of alkali metal or alkaline earth metal, and CaO and Ca (OH)$_2$ are preferred, because the cost is low and there is no risk in handling.

The carbonate that is solid at ordinary temperature includes but is not limited to carbonates of alkali metal or alkaline earth metal, and NaHCO$_3$ and Na$_2$CO$_3$ are preferred, because the cost is low and there is no risk in handling.

As the organic acid that is solid at ordinary temperature, although there are various organic acids, the organic acid needs to be liquid at 200-260° C. where PET resin melts, and the metal salt of the organic acid needs to be solid at the extrusion temperature of PET resin being around 270° C., in order to act as the crystal nucleator. As such organic acids, there are benzoic acid (mp: 122° C., Na benzoate: mp=300° C. or more, Ca benzoate: mp=300° C. or more) and phthalic acid (mp: 191° C., Ca phthalate: mp=300° C. or more, K hydrogen phthalate: mp=295-300° C.), but not limited to them.

Subsequently, the reaction between the basic material and the organic acid, or between the carbonate and the organic acid proceeds in the cylinder of the extruder upon making the reacted MB will be explained.

In a case of the basic material and the organic acid:

[Chemical 1]

1 mole of calcium hydroxide reacts with 1 mole of phthalic acid to produce 1 mole of calcium phthalate and 2 moles of water. The equivalent relationship is 1 mole of calcium hydroxide=1 mole of phthalic acid=1 mole of calcium phthalate. In the relationship, the inorganic basic material and the organic acid react through a neutralization reaction.

In a case of the carbonate and the organic acid:

[Chemical 2]

1 mole of sodium hydrogen carbonate reacts with 1 mole of benzoic acid to produce 1 mole of sodium benzoate and 1 mole of water and 1 mole of carbon dioxide gas. The equivalent relationship is 1 mole of sodium hydrogen carbonate=1 mole of benzoic acid=1 mole of sodium benzoate. The inorganic carbonate and the organic acid react in the relationship of weaker acid salt+stronger acid→stronger acid salt+weaker acid, and carbonic acid ($H_2CO_3$) is a weakest acid.

In order that the produced organic acid metal salt particulates act as the crystal nucleator, they need to exist in solid at the extrusion temperature of the PET resin, to which the reacted MB has been added, being around 270° C. Therefore, their melting point needs to be higher than the extrusion temperature. The reaction proceeds in molecular size to produce the organic acid metal salt also in molecular size. It is considered that the produced organic acid metal salt is present not as single molecule but as an aggregate formed by gathering the molecules or crystal formed by growing it. However, since the produced organic acid metal salt is kneaded with the PETG resin for masterbatch at the kneader portion of the cylinder of the extruder before growing up to a large aggregate or large crystal, it is dispersed uniformly into the PETG resin, as in the state of a fine aggregate or fine crystal, and acts as the crystal nucleator effectively. The PETG resin is a copolymer of terephthalic acid and ethylene glycol and 1, 4-cyclohexane dimethanol, and sold by Eastman Chemical Co., Ltd under the tradename of Easter PETG 6763. The resin is characterized by removing crystallinity of PET completely.

However, it is unclear as to how many molecules gather to form effective crystal nucleator. Then, the applicant estimates that, in the case of effective foaming nucleator, it is made by gathering $1.1 \times 10^{10}$ molecules, by the assumption that 1 bubble generates from 1 aggregate or crystal, from the number of bubbles and the amount of reaction product produced from the added foaming nucleator in the "supercritical foaming method". Since both of the foaming nucleator and the crystal nucleator act as a stimulator for foaming or crystallization, i.e. exhibit almost similar action, it is considered that a crystal nucleator is formed by gathering approximately the same quantity of molecules as the case of a foaming nucleator.

Figure 2:
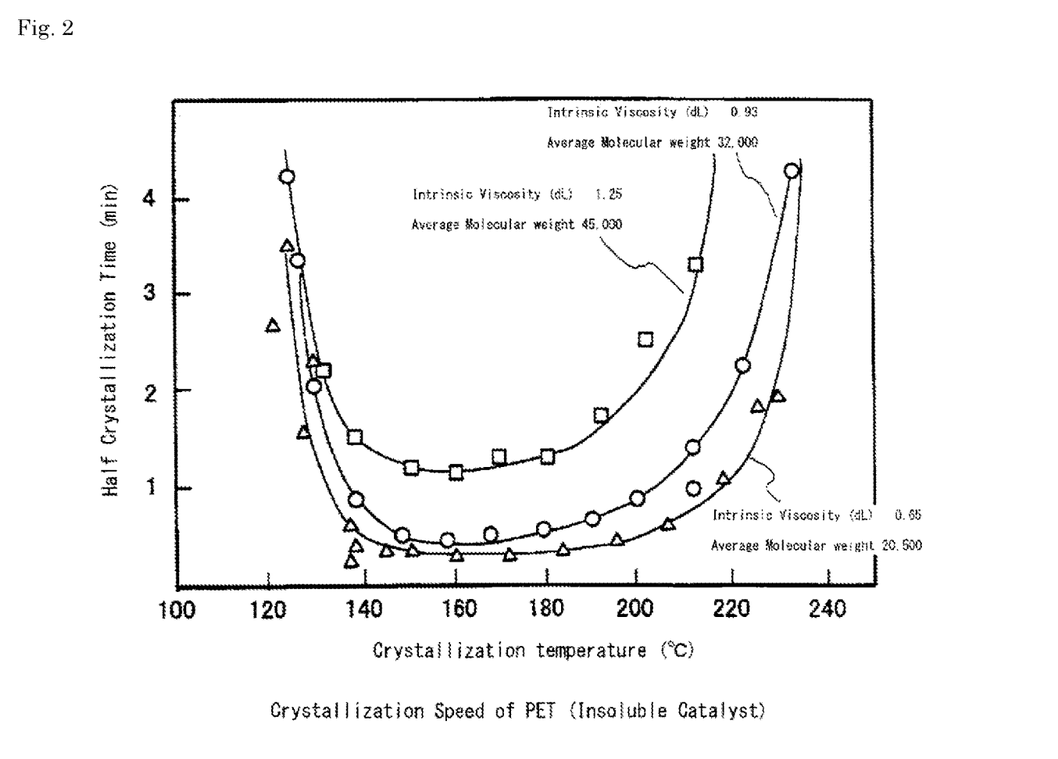
FIG. 2 A graph indicating crystallization rate of PET.

For example, in the case that the organic acid metal salt is sodium benzoate, the weight of 1 mole of sodium benzoate is 144 g, and the number of molecules of 1 mole is $6.02 \times 10^{23}$ being Avogadro's number. That is, the weight of 1 molecule of sodium benzoate is $144 \div (6.02 \times 10^{23}) = 2.39 \times 10^{-22}$ g. The weight of effective aggregate or crystal as the crystal nucleator becomes $2.39 \times 10^{-22} \times 1.1 \times 10^{10} = 2.6 \times 10^{-12}$ g. Therefore, the aggregate or crystal is very fine and cannot be seen visually. Crystals are considered to grow on the aggregate or crystal. When the diameter of the crystal is 400 nm, which is under the limit of the wavelength of visible rays (400~700 nm or less), the molding sheet is transparent. When the diameter of the crystal is greater than 400 nm, the molding sheet becomes white due to the total reflection of visible rays. The crystallinity rises with the growth of crystals to impart heat resistance to the container. Optimum temperature range for crystallization is, as shown in FIG. 2, 130-220° C., and the crystallinity can be controlled by varying the temperature and time being in contact with the mold upon molding the sheet into containers. When heat resistance is imparted in the crystal size of 400 nm or less, the container is a transparent heat-resistant container. When the crystals grow greater than 400 nm in size, the container is a white highly heat-resistant container. The boundary of the crystallinity between transparent and white is about 22%.

A preferable blending amount of the mixture of the inorganic basic material or carbonate that is solid at ordinary temperature and the organic acid that is solid at ordinary temperature is the equivalent relationship is 0.01-1.0% by weight, more preferably 0.05-0.8% by weight against the resin composition to be molded into the molding sheet. When the blending amount is less than 0.01% by weight, it is difficult to disperse the organic acid metal salt being the reaction product thereof uniformly into PET resin. Whereas, even exceeding the blending amount of 1.0% by weight, the effect does not increase, and the excess amount merely raises the cost.

For example, in the case that the reaction product is sodium benzoate, when the blending amount is 0.05% by weight:

$$0.05 \times \frac{\text{MW of Na benzoate}}{\text{MW of NaHCO}_3 + \text{MW of benzoic acid}} = \quad \text{[Mathematical 2]}$$

$$0.05 \times \frac{144}{84 + 122} = 0.035$$

0.035% by weight of Na benzoate is present. The number of the aggregates or crystals being effective as crystal nucleator is:

$$\frac{0.035}{\text{Weight of aggregates or crystals effective as nucleator}} = \quad \text{[Mathematical 3]}$$

$$\frac{0.035}{2.6 \times 10^{-12}} = 1.3 \times 10^{10}$$

and therefore, $1.3 \times 10^{10}$ crystal nucleators are dispersed in about 100 g of PET resin.

Thus, when the blending amount of the mixture is 0.50% by weight, the number of the crystal nucleators is $1.3 \times 10^{11}$. When the blending amount is 5.0% by weight, the number is $1.3 \times 10^{12}$. Namely, the quantity of the aggregate or crystal effective as a crystal nucleator increases ten times by raising the amount of the mixture ten times. However, in view of effective quantity of the crystal nucleator as a whole, the increase is small. Thus, when the blending amount of the mixture exceeds 1.0% by weight, the excess amount becomes foreign matter and influences the properties of the PET resin.

The method of adding the reacted MB to the PET resin may be carried out by dry blending of a prescribed amount with the PET resin, or by adding a prescribed amount by a volumetric feeder to the PET resin in a hopper of an extruder.

Since the PETG resin forming the reacted MB is an amorphous PET resin, it is not necessary to raise the temperature up to around 260° C. for melting the crystal of common PET resin, but it is melted at a low temperature around 200° C. Therefore, the extrusion temperature can be set at 200-220° C. where the solid organic acid (benzoic acid: mp=122° C., phthalic acid: mp=191° C.) is melted into a liquid state, and infiltrated into solid inorganic basic material or carbonate to react with it. Especially, in the case of phthalic acid, since it dehydrates at 231° C. or more to convert into phthalic anhydride, which is not acid, it is necessary that the temperature is not raised up to 231° C.

It is considered that, in undried PET resin, PET resin for fiber, recovered PET flakes, etc., depolymerization of PET resin occurs through hydrolysis or thermal decomposition caused by their moisture content in cooperation with the heat of the extruder to generate a lower molecular weight PET molecular chain, ethylene glycol and acetaldehyde. A chain extender is added in order to bind such lower molecular weight PET molecular chains to modify them into higher molecular weight PET resin having a three-dimensional structure. Examples of the chain extender to be added include glycidyl acrylate, glycidyl methacrylate, styrene-methyl(metha)acrylate-glycidyl methacrylate, epoxidized soybean oil and the like. Preferred chain extenders are multifunctional having 4 or more epoxy groups. The multifunctional chain extenders having 4 or more epoxy groups are sold by BASF Japan Ltd., Toakasei Co., Ltd., etc., such as "JONCRYL" (BASF Japan Ltd.) and "ARUFON" (Toakasei Co., Ltd.).

A preferred blending amount of the chain extender is, in general, 0.2-1.0% by weight, and is controlled by the performance of the chain extender. As the method of adding the chain extender, it is preferable to make a MB, and to add it. The MB is made by adding 10-50% by weight of the chain extender to 50-90% by weight of PETG resin, followed by kneading by an extruder to pelletize it. The blending may be carried out by mixing a prescribed amount of the MB with the PET resin, or by feeding the MB by a volumetric feeder.

As mentioned previously, in an aspect of the invention, the molding sheet is made by adding the reacted MB, wherein the basic material or carbonate and the organic acid have been allowed to react, and the MB of the chain extender to the PET resin, charging the mixture into the extruder having 2 or more vent holes, degassing under a condition where the PET resin is melted with heating by sucking at a high vacuum of −99.99 kPa or more from the vent holes, and extruding into the molding sheet.

Figure 1:
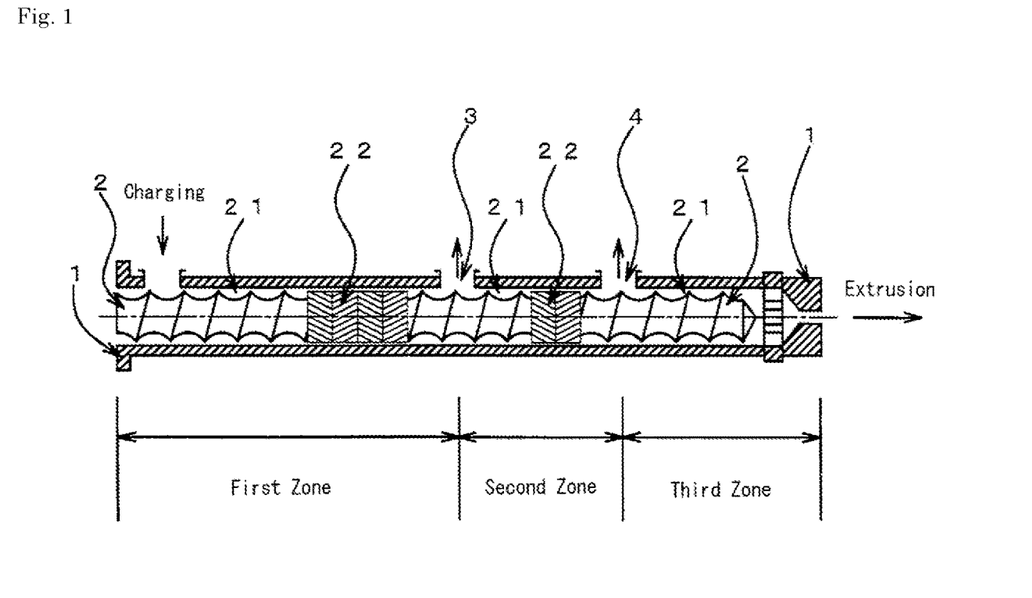
FIG. 1 A schematic view of the cylinder portion of an extruder having 2 or more vent holes.

FIG. 1 is a schematic illustration of an extruder having two or more vent holes applicable to the invention. In FIG. 1, numeral 1 indicates the cylinder placed horizontally, and a screw 2 is provided therein. A first vent hole 3 and a second vent hole 4 are formed on the upside of the cylinder 1, locating the first vent hole 3 on the upstream side. The inside of the cylinder 1 is divided into three kneading portions 21 and two sealing portions 22 alternately. A back pressure of 100 to 200 kg/cm$^2$ is added to the molten resin filled in the kneading portion 21, and a high vacuum of −99.99 kPa or more is applied to the vent holes 3, 4. In the sealing portions 22, the pitch of the threads is narrower than that in the kneading portion 21 to retard the advance of molten resin to form a seal. Moreover, the gap between the inner wall of the cylinder 1 and the upper end of the thread is also narrowed. Thus, the sealing portions 22 prevent the molten resin from slipping away through the gap, and force the advance of the molten resin only by rotation of the screw 2 to prevent blow up of the molten resin through the vent holes 3, 4 and to knead and disperse the reaction product of the organic acid metal salt.

Each of the vent holes 3, 4 is connected to an oil-sealed rotary vacuum pump (not illustrated) through a condenser (not illustrated). The condenser is to keep the degree of vacuum, and to maintain the quality of oil in the oil-sealed rotary vacuum pump. If the condenser does not exist, for example, when the PET resin having a moisture content of 3,000 ppm are processed at a discharge rate of 500 kg/hr, water vapor is generated at a rate of 500,000 g×0.3/100=1,500 g/hr. As a result, a high vacuum cannot be maintained, and oils in the oil-sealed rotary vacuum pump are deteriorated by the contamination of water.

In operation, the PET resin mixed with each MB is charged into the cylinder 1 of the extruder, and the extruder is worked at an extrusion temperature of 270 to 300° C., typically around 280° C. with a back pressure of 100 to 200 kg/cm$^2$, while sucking to degas from the vent holes 3, 4 with a high vacuum of −99.99 kPa or more, to extrude the mixed PET into a sheet.

The charged mixed resin is, in the first zone, heated to melt, and kneaded together with the reacted MB and the chain extender. It is considered that, in the molten PET resin, depolymerization occurs through hydrolysis and pyrolysis by water and heat to generate lower molecular PET chains, ethylene glycol and acetaldehyde. However, it is also considered that, since the chain extender is added from the start and kneaded, a polymerization reaction begins where the lower molecular PET chains are bonded to produce a higher molecular weight three-dimensional structure, and ethylene glycol and acetaldehyde are trapped.

That is, cleavage of the epoxy groups

[Chemical 3]

occurs to bond to functional groups, such as a carboxyl group (—COOH), an aldehyde group (—CHO), or a hydroxyl group (—OH), to render the PET molecular chains to higher molecular weight molecules with a three-dimensional network structure, and ethylene glycol produced by depolymerization and acetaldehyde generated from ethylene glycol are also trapped as a part of the higher molecular weight molecules. Moisture contained in the molten PET is in a state of liquid in the back pressure range of 100 kg/cm² or more, since saturated vapor pressure is 65 kg/cm² at 280° C.

Then, when the molten PET containing ethylene glycol, acetaldehyde and water arrives at the first vent hole 3, since the pressure is rendered at a high vacuum of −99.99 kPa or more there, ethylene glycol (b.p.: 198° C.), acetaldehyde (b.p.: 20° C.) and water (b.p.: 100° C.) are vaporized, and sucked and degased through the first vent hole 3. Whereas, remaining ethylene glycol, acetaldehyde and water, which are not sucked off at the first vent hole 3, are sucked and degased at the second vent hole 4.

In the second zone, it is considered that, although depolymerization also occurs partly, in most part, the polymerization reaction occurs by the chain extender.

In the third zone, only the polymerization reaction by the chain extender and dispersion of the organic acid metal salt occur, and the sheet is extruded where the organic acid metal salt is uniformly dispersed in the PET resin having a higher molecular weight three-dimensional structure.

The extruded molding sheet is heated to 80-130° C. and then, formed into a container by a vacuum or vacuum-pressure forming machine using a mold. Then, it is heat-set by keeping the temperature at 130-220° C. in the same mold. The crystallinity represented by the following formula of the container is determined by the keeping time in the mold. Crystals begin to grow on the organic acid metal salt as the crystal nucleator from the time when the temperature of the molded container in the mold reaches the optimum crystallization temperature (130-220° C.) shown in FIG. 2. When the size of the crystal is 400 nm or less, the container becomes a transparent heat-resistant (around 120° C.) container. When crystallization further proceeds, it becomes a whitened high heat-resistant (200° C. or more) container.

$$\text{crystallinity}(\%) = \frac{\text{heat quantity of fusion per mole} - \text{heat quantity of cold crystallization per mole}}{\text{heat quantity of fusion per mole of perfect crystal of PET (26.9 KJ)}} \times 100$$

[Mathematical 1]

The mold may be a conventional female mold molding with a plug assist or a so-called matched mold where the female mold and the male mold have a similar figure. However, in the case of molding a container being clear and having heat resistance up to 120° C., the matched mold is most suitable. Since the container is still soft immediately after molding due to the crystallinity being about 22% or less, i.e. abundant non-crystal portion exist, it is difficult to release the container from the conventional mold due to its deformation.

In the case of molding the container using the matched mold, the male mold is made a heating mold, and the female mold is made a cooling mold. The container is molded with heating by blowing pressure air from the cooling mold of the female mold together with sucking from the vacuum port of the male mold, and after passing a prescribed time, the container is cooled by blowing air conversely from the vacuum port of the male mold to release the container together with sucking to press it to the female mold. Thereby, the release of the container from the mold is facilitated to raise the number of cycles.

In the case of opaque highly heat-resistant container, since the container resists deformation even at the mold temperature upon releasing due to the progress of crystallization, the mold may be either of the conventional mold or the matched mold.

EXAMPLE 1

[Preparation of Molding Sheet]

84 g of sodium hydrogen carbonate and 122 g of benzoic acid were mixed. 4.29 g of the equivalent mixture was allowed to react by the heat of the extruder during kneading with 95.71 g of PETG to produce the reacted MB. 1.0% by weight of chain extender MB (Meisai Kagaku Co., Ltd., prototype, 70% by weight of PETG+30% by weight of "ADR 4368S", manufactured by BASF Japan Ltd.) and 4.0% by weight of the reacted MB (containing 3.0% by weight as Na benzoate) were added to 95% by weight of PET resin (manufactured by Unitika Ltd., "MA-2101M", intrinsic viscosity: 0.62 dl/g, moisture content: 3,100 ppm), each by a volumetric feeder, and the mixture was charged into a double-screw extruder wherein the screws rotated in the same direction ("HMT 100", L/D=38, discharge: 650 kg/hr, 2 vent holes, manufactured by Hitachi Zosen Corp.), and extruded at an extrusion temperature of 280° C. while sucking to degas through the vent holes at a high vacuum of −101 kPa to form a molding sheet 0.3 mm in thickness.

<Behavior of Moisture Content>

While extruding continuously at a processing speed of 20 m/min., screws and sucking were temporarily stopped, and resin samples were taken from the position of the first vent hole and the second vent hole of the extruder. Moisture content of each resin sample was measured by using a moisture vaporization apparatus for plastics ("ADP-351" type, manufactured by Kyoto Electronics Manufacturing Co., Ltd.) and a Karl Fischer moisture meter ("MKC-210" type, manufactured by Kyoto Electronics Manufacturing Co., Ltd.). The results are shown in Table 1.

TABLE 1

| | Position | | |
|---|---|---|---|
| PET Resin | Before Charging | First Vent Hole | Second Vent Hole |
| MA-2101M | 3,100 ppm | 8 ppm | 0 ppm |

The moisture content of the undried PET resin was decreased to less than 10 ppm at the first vent hole, which clears 50 ppm or less which is essential for the extrusion of conventional PET resin. At the position of the second vent hole, the moisture content was zero, and it can be seen that the sucking to degas through vent holes obviates the need for prior drying.

<Evaluation of Residual Acetaldehyde>

The molding sheet made above was cut into pieces of 1 cm×2 cm to prepare many cut pieces, and the cut pieces having a total surface area of 250 cm$^2$, which is the sum of the front side and the rear side, were placed in a 500 ml conical glass flask with a ground-glass stopper.

After replacing air in the flask by $N_2$ gas at 40° C. in a room at 40° C. (2 ml $N_2$ gas/1 cm$^2$ surface area). The aperture was stopped by the stopper, and allowed to stand at 40° C. for 24 hours. The vapor phase in the conical flask after the above treatment was examined by a five member panel as to the presence or absence of foreign odor. Moreover, acetaldehyde in the vapor phase was measured by a gas chromatograph with a FID detector ("GC-6A" type, manufactured by Shimazu Corporation). The results are shown in Tables 2 and 3.

TABLE 2

Odor Test by Panel Members

| No. of Panel Members | Presence of Foreign Odor |
|---|---|
| 5 | None of 5 members felt foreign odor. |

TABLE 3

Detection of Aldehyde by Gas Chromatograph

| Sample | Acetaldehyde |
|---|---|
| Vapor phase in the flask | 0 µg/l |

Foreign odor was not felt by all of the panel members, and acetaldehyde was not detected by the gas chromatograph. Therefore, it was confirmed that residual aldehyde was not present.

[Molding of Cover of Tray Container]

A mold was prepared for molding a transparent cover of a tray for daily dishes. The cover has an opening portion (the major diameter: 15 cm, the minor diameter: 11 cm) a top (the major diameter: 11 cm, the minor diameter: 8 cm), where the four corners of the opening portion are rounded to meet the shape of the tray, and the area from the opening portion to the top is gently rounded.

The mold was made a so-called matched mold composed of a male mold and a female mold having a similar form with a space of 1.0 mm therebetween. Both of the female mold and the male mold were provided with vacuum-pressure ports of 0.7 mm, and thereby, were made possible to suck and to blow pressure air by changing between vacuum and pressure air. The mold was attached to a vacuum-pressure forming machine (manufactured by Wakisaka Engineering Co., Ltd., "FVS-5000P").

The molding sheet prepared as above was heated to be softened by a heater so that the surface temperature was made 130° C. The male mold was made a heating mold at 140° C., and the female mold was made a cooling mold at 50° C. Under the conditions, the vacuum-pressure air ports of the male mold were set to vacuum, and the vacuum-pressure air ports of the female mold were set to pressure air to blow pressure air at 0.5 MPa, and thereby, the molding sheet was allowed to adhere to the male mold for 5.0 seconds to form a cover. Subsequently, the vacuum-pressure air ports of the male mold were changed to pressure air to blow pressure air at 0.5 MPa, and the vacuum-pressure air ports of the female mold were changed to vacuum, and thereby, the cover was allowed to adhere to the female mold for 5.0 seconds to cool it, and then, taken out. The molded article had good release ability from the mold, and reproduced the mold shape completely without wrinkles and deformation. Moreover, the appearance was clean and beautiful.

<Crystallinity of Molded Articles>

Figure 3:
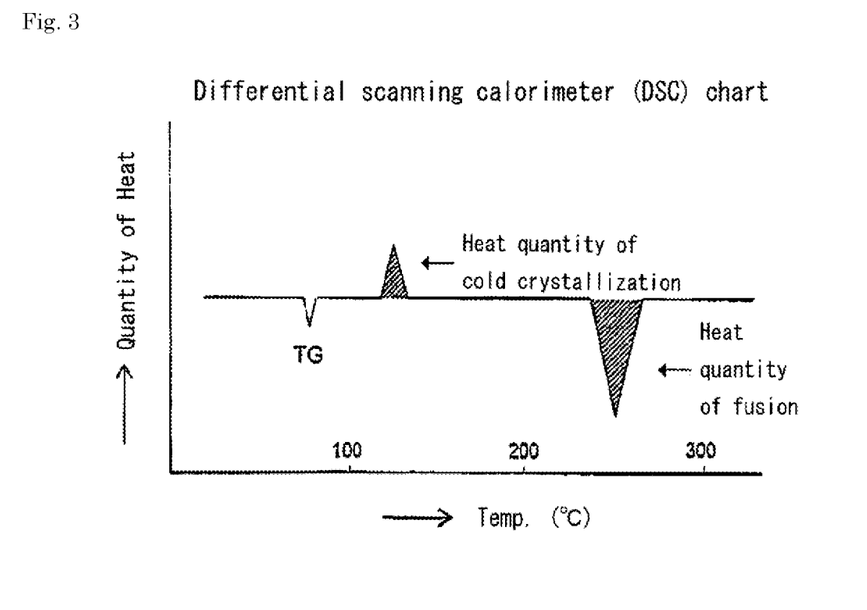
FIG. 3 A schematic DSC chart.

A part of the top of the molded article was cut off, and 10.0 mg of the part was used as a sample. Each heat quantity was determined by a differential scanning calorimeter (Seico Electronics Industrial Co., Ltd. "DSC 220"). As the measuring conditions, the sample (10.0 mg) was measured with heating to elevate from 20° C. to 300° C. at a temperature elevation rate of 10° C./min while flowing nitrogen at 50 ml/min. A schematic DSC chart is shown in FIG. 3. When elevating temperature, a small minus peak appears at around 80° C. which indicates the glass transition temperature. Then, a plus peak appears at around 120° C. which indicates a cold crystallization peak, and the area shown by diagonal lines represents quantity of heat of cold crystallization. The minus peak appearing at around 255° C. indicates fusion, and the area shown by diagonal lines represents quantity of heat of fusion. Since A-PET is not completely amorphous, partial crystallization occurs while elevating temperature. The crystallization is called cold crystallization. The crystallinity was determined by the following formula:

$$\text{crystallinity}(\%) = \frac{\text{heat quantity of fusion per mole} - \text{heat quantity of cold crystallization per mole}}{\text{heat quantity of fusion per mole of perfect crystal of PET (26.9 KJ)}} \times 100 \quad [\text{Mathematical 1}]$$

The crystallinity was found to be 21.4%.

<Heat Resistance and Transparency of Molded Article>

Although the molded article was transparent, it is considered that, when heated, the molded article becomes gradually opaque with crystallization proceeding by heating. Then, the molded article was placed in a temperature controlled dryer at 120° C., 140° C. or 160° C., and allowed to stand for 5 minutes. The results are shown in Table 4.

TABLE 4

| Item | After Molding | 120° C. 5 min | 140° C. 5 min | 160° C. 5 min |
|---|---|---|---|---|
| Transparency | Transparent | Transparent | White Opaque | White Opaque |
| Heat Resistance | — | Not Deformed | Not Deformed | Not Deformed |
| Crystallinity | 21.4% | 21.6% | 31.5% | 33.2% |

As can be seen from Table 4, in the case of 120° C., crystallization did not proceed because of being out of the fast crystallization speed temperature zone of PET resin shown in FIG. 2. Therefore, the transparency after molding was kept, and nevertheless, the molded article was not deformed and was heat-resistant, due to the crystallinity of 21.6%.

Whereas, in the cases of 140° C. and 160° C., these temperatures enter the fast crystallization speed temperature zone in FIG. 2, and crystallization proceeds. Therefore, crystals grew up to greater than the lower end of 400 nm of visible rays, to reflect total visible rays, and the molded article became white and opaque. Since both temperatures are in the fast crystallization speed temperature zone, the difference in crystallinity is little, and both molded articles were not deformed and were heat-resistant.

EXAMPLE 2

[Preparation of Molding Sheet]

2.0% of weight of chain extender (Meisai Kagaku Co., Ltd., prototype, 70% by weight of PETG+30% by weight of "ADR 4368S", manufactured by BASF Japan Ltd.) and 4.0% by weight of the reacted MB (containing 3.0% by weight as Na benzoate) produced by allowing sodium hydrogen carbonate and benzoic acid to react previously similar to Example 1, were added to 94.0% by weight of pellets prepared from recovered PET flakes, each by a volumetric feeder, and the mixture was charged into the main extruder ("TEX 105α ", manufactured by NIPPON SEIKO SHO, Ltd., L/D=31, double shaft, 2 vent holes), extruded at an extrusion temperature of 280° C. with sucking to degas through the vent holes at a high vacuum of −101 kPa and introduced into the coextrusion die.

Virgin PET resin (PET resin "CR8816", manufactured by CR Chemical Holdings Co., Ltd., intrinsic viscosity: 0.815 dl/g, moisture content: 400 ppm) was dried at 140° C. for 4 hours or more to render the moisture content 50 ppm or less, and charged into two subsidiary extruders ("TEX 652", manufactured by NIPPON SEIKO SHO, Ltd., L/D=31, double shaft, 2 vent holes), extruded at an extrusion temperature of 280° C. and introduced into the coextrusion die. Thus, a molding sheet which was a laminated sheet of virgin PET layer (30 μm)/main layer (340 μm)/virgin PET layer (30 μm) having a total thickness of 0.4 mm was manufactured.

[Molding of Heat-Resistant Container]

The male mold was formed having an upside diameter of 130 mmφ, and underside diameter of 97 mmφ, a depth of 35 mm, and the underside corners were rounded into R shape. The female mold was made into a similar form with a space of 1.0 mm therebetween. They were attached to the vacuum-pressure forming machine (manufactured by Wakisaka Engineering Co., Ltd., "FVS-5000P"), similar to Example 1.

The molding sheet prepared as above was heated to be softened by a heater so that the surface temperature was made 130° C. The male mold was made a heating mold at 160° C., and the female mold was made a cooling mold at 50° C. Under the conditions, the vacuum-pressure air ports of the male mold were set to vacuum, and the vacuum-pressure air ports of the female mold were set to pressure air to blow pressure air at 0.5 MPa, and thereby, the molding sheet was allowed to adhere to the male mold for 5.0 seconds to form a container. Subsequently, the vacuum-pressure air ports of the male mold were changed to pressure air to blow pressure air at 0.5 MPa, and the vacuum-pressure air ports of the female mold were changed to vacuum, and thereby, the container was allowed to adhere to the female mold for 5.0 seconds to cool it, and then, taken out. The molded article had good release ability from the mold, and reproduced the mold shape completely without wrinkles and deformation. Moreover, the appearance was white and opaque due to proceeding of crystallization of the main layer to increase the crystal size to 400 nm or more.

<Crystallinity of Molded Articles>

A part of the bottom portion of the molded article was cut off, and 10.0 mg of the part was used as a sample. Each heat quantity was determined by a differential scanning calorimeter (Seico Electronics Industrial Co., Ltd. "DSC 220"), and the crystallinity was calculated based on the following formula. As the measuring conditions, the sample (10.0 mg) was measured with heating to elevate from 20° C. to 300° C. at a temperature elevation rate of 10° C./min while flowing nitrogen at 50 ml/min. The measured value includes the virgin PET layers in addition to the main layer.

$$\text{crystallinity}(\%) = \frac{\text{heat quantity of fusion per mole} - \text{heat quantity of cold crystallization per mole}}{\text{heat quantity of fusion per mole of perfect crystal of PET (26.9 KJ)}} \times 100 \quad \text{[Mathematical 1]}$$

The crystallinity was found to be 30.5%. This is the value including the virgin PET layers, and it is considered that crystallization did not proceed in the virgin PET layers because of not including crystal nucleator. Accordingly, the crystallinity of the main layer is considered to be higher than the above value.

<Heat Resistance of Molded Article>

The molded article was placed in a temperature controlled dryer at 200° C., and allowed to stand for 30 minutes. The appearance was observed, and found to keep the original form before the test, without shrinkage, wrinkles and deformation. Therefore, it is considered that the molded article has a heat resistance up to 200° C.

DESCRIPTION OF REFERENCE SIGNS

1: Cylinder
2: Screw
3: First vent hole
4: Second vent hole
21: Kneading portion
22: Sealing portion

The invention claimed is:

1. A method of manufacturing a transparent, heat-resistant container, comprising:
    a molding sheet-making process comprising making a reacted masterbatch by mixing an inorganic basic material or carbonate that is solid at ordinary temperature with an organic acid that is solid at ordinary temperature and adding the mixture to a PETG resin,
    allowing the masterbatch to react by heating and kneading to produce the organic acid metal salt particulates,
    adding the reacted masterbatch to a PET resin,
    charging the mixture of the reacted masterbatch and the PET resin into an extruder having two or more vent holes,
    degassing under a condition where the PET resin is melted with heating by sucking at a vacuum of −99.99 kPa or more from the vent holes, and
    extruding into the molding sheet, and
    a container-molding process, comprising:
    heating the molding sheet to 80-130° C.,
    forming the heated molding sheet into a container shape by a vacuum or vacuum-pressure forming machine using a mold, and
    heat-setting by keeping the formed molding sheet at 130-220° C. in the same mold to obtain a container,
    wherein the container has a crystallinity of 18% or more represented by the following formula:

$$\text{crystallinity}(\%) = \frac{\text{heat quantity of fusion per mole} - \text{heat quantity of cold crystallization per mole}}{\text{heat quantity of fusion per mole of perfect crystal of PET (26.9 KJ)}} \times 100.$$

2. The method of manufacturing a transparent, heat-resistant container as set forth in claim 1, wherein the amount of the reacted masterbatch corresponds to 0.01-1.0% by weight as the mixture of the inorganic basic material or carbonate that is solid at ordinary temperature and the organic acid that is solid at ordinary temperature, and 0.2-1.0% by weight of a chain extender for PET resin is also added to the PET resin.

3. The method of manufacturing a transparent, heat-resistant container as set forth in claim 1, wherein said inorganic basic material or carbonate that is solid at ordinary temperature comprises at least one of CaO, Ca(OH)$_2$, NaHCO$_3$ and Na$_2$CO$_3$, and said organic acid that is solid at ordinary temperature comprises at least one of benzoic acid and phthalic acid.

4. The method of manufacturing a transparent, heat-resistant container as set forth in claim 2, wherein said chain extender for PET resin is styrene-methyl(metha)acrylate-glycidyl methacrylate.

5. The method of manufacturing a transparent, heat-resistant container as set forth in claim 1, wherein said container molded in the container-forming process has a crystallinity of 18-22%.

6. A method of manufacturing a transparent, heat-resistant container, comprising:

making a reacted masterbatch by mixing an inorganic basic material or carbonate that is solid at ordinary temperature with an organic acid that is solid at ordinary temperature and adding the mixture to a PETG resin, allowing the masterbatch to react by heating and kneading to produce the organic acid metal salt particulates, adding the reacted masterbatch in an amount corresponding to 0.01-1.0% by weight as the mixture of the inorganic basic material or carbonate that is solid at ordinary temperature and the organic acid that is solid at ordinary temperature, and 0.2-1.0% by weight of a chain extender for PET resin to the PET resin, charging the mixture of the reacted masterbatch and the PET resin into an extruder having two or more vent holes, degassing under a condition where the PET resin is melted with heating by sucking at a vacuum of −99.99 kPa or more from the vent holes, and introducing into a T die for coextrusion, charging a PET resin into a subsidiary extruder, melting it with heating, and introducing the T die for coextrusion, molding a coextruded molding sheet comprising a main layer made of the PET resin including the organic acid metal salt particulates produced from the inorganic basic metal compound and the organic acid, and at least an inner layer made of the PET resin, heating the coextruded molding sheet to 80-130° C., forming into a container shape by a vacuum or vacuum-pressure forming machine using a mold, and heat-setting by keeping the formed molding sheet at 130-220° C. in the same mold to obtain a container, wherein the container thus formed has a crystallinity of 18% or more represented by the following formula:

$$\text{crystallinity [\%]} = \frac{\text{heat quantity of fusion per mole} - \text{heat quantity of cold crystallization per mole}}{\text{heat quantity of fusion per mole of perfect crystal of PET (26.9 KJ)}} \times 100.$$

* * * * *